United States Patent
Pedros et al.

(10) Patent No.: US 7,438,813 B1
(45) Date of Patent: Oct. 21, 2008

(54) AMMONIA OXIDATION AND PIPE DENITRIFICATION

(76) Inventors: Philip B. Pedros, 49 Fairmont Ave., Wakefield, MA (US) 01880; Keith Dobie, 128 Central Ave., Humarock, MA (US) 02047

( * ) Notice: Subject to any disclaimer, the term of this patent is extended or adjusted under 35 U.S.C. 154(b) by 20 days.

(21) Appl. No.: 11/787,030

(22) Filed: Apr. 13, 2007

Related U.S. Application Data

(60) Provisional application No. 60/791,729, filed on Apr. 13, 2006.

(51) Int. Cl.
 *C02F 3/00* (2006.01)
(52) U.S. Cl. .................. 210/603; 210/610; 210/620; 210/631
(58) Field of Classification Search ............ 210/603, 210/610, 620–628, 631
See application file for complete search history.

(56) References Cited

U.S. PATENT DOCUMENTS

| | | | |
|---|---|---|---|
| 5,078,884 A | 1/1992 | Mulder | |
| 5,863,435 A | 1/1999 | Heijnen et al. | |
| 6,183,642 B1 | 2/2001 | Heijnen et al. | |
| 6,383,390 B1 | 5/2002 | Van Loosdrecht et al. | |
| 2004/0256315 A1* | 12/2004 | Boyd et al. ............... | 210/610 |
| 2006/0032815 A1 | 2/2006 | Van Loosdrecht et al. | |

FOREIGN PATENT DOCUMENTS

JP 2003126886 A * 5/2003

OTHER PUBLICATIONS

Mulder, J.W., et al. (2001), Full-scale application of the SHARON process for treatment of rejection water of digested sludge dewatering, Water Science and Technology, vol. 43, No. 11, pp. 127-134.

Hellinga, C., et al.. (1998), The SHARON Process: An Innovative Method For Nitrogen Removal From Ammonium-Rich Waste Water, IAWQ, pp. 135-142.

* cited by examiner

*Primary Examiner*—Chester T. Barry
(74) *Attorney, Agent, or Firm*—John P. McGonagle

(57) ABSTRACT

In a biological wastewater treatment system, the addition of an intermittently aerated second bioreactor to accomplish ammonium oxidation to predominately nitrite and then to achieve denitrification by introducing the effluent, containing nitrite, from the second bioreactor into the influent collection system or the head works of a wastewater treatment plant. Denitrification from nitrite occurs in the collection pipe using the influent organics as a carbon source.

3 Claims, 3 Drawing Sheets

AMMONIA OXIDATION AND PIPE DENITRIFICATION

CROSS-REFERENCE TO RELATED APPLICATIONS

Applicant claims the priority benefits of U.S. Provisional Patent Application No. 60/791,729 filed Apr. 13, 2006.

BACKGROUND OF THE INVENTION

This invention relates to waste treatment systems, and in particular, to a method for removing ammonia content from waste streams with a high ammonium-nitrogen concentration.

The supernatant from the anaerobic digestion of blended or secondary sludge contains high concentrations of ammonium that as a recycle stream to the influent of a wastewater treatment plant may account for as much as 25% of the nitrogen loading to the plant. In addition, this recycle stream typically does not contain the requisite carbon to nitrogen ratio (C/N) for nitrogen removal. However, removal of the nitrogen prior to reentering the treatment plant would reduce the main treatment plant's downstream nitrification and denitrification requirements and may provide additional options for treatment plant upgrades.

The removal of nitrogen from wastewater streams is a two step process. In the first step the oxidation of ammonium to nitrate (i.e. nitrification) is accomplished by the aerobic growth of chemolithotrophic, autotrophic bacteria in an aerobic environment. This first step results from two separate, sequential reactions. The first reaction in step one is the conversion of ammonium to nitrite as described by:

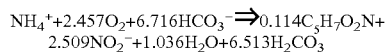

This is carried out by ammonia oxidizing bacteria (AOB). The second reaction in step one is the conversion of nitrite to nitrate and is described by:

$$NO_2^- + 0.001NH_4^+ + 0.014H_2CO_3 + 0.003HCO_3^- + 0.339O_2$$
$$\Rightarrow 0.006C_5H_7O_2N + 0.003H_2O + 1.348NO_3^-$$

This is carried out by nitrite oxidizing bacteria (NOB). The overall biochemical transformation is described by the following mass based stoichiometric equation, normalized to ammonium.

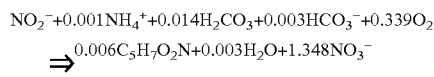

In the second step organic carbonaceous matter (organics) is oxidized by the growth of heterotrophic bacteria utilizing nitrate as the terminal electron accepter (i.e. denitrification). The equation describing the biochemical transformation depends on the organic carbon source utilized. The following is the mass based stoichiometric equation, normalized with respect to nitrate, with the influent as the organic carbon source (Water Environment Federation 1998).

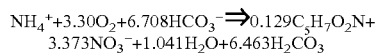

Nitrification occurs only when the quantity of organic carbonaceous matter has been reduced according to the well-established criterion for the transition from oxidation of organics to nitrification, within the biofloc. However, typically, the centrate from the dewatering process does not contain a large quantity of organics and therefore the criterion to achieve nitrification is readily established. However, the low carbon to nitrogen ratio (C/N) resulting from the lack of organics means that denitrification will not proceed without a supplemental carbon source.

SUMMARY OF THE INVENTION

This process is designed to achieve complete nitrogen removal from a high ammonium concentration waste stream while minimizing both the quantity of air and the quantity of supplemental organic carbon required. This is achieved by using an intermittently aerated bioreactor to accomplish ammonium oxidation to nitrite (i.e. achieve only the first reaction in step one), and then to achieve denitrification by introducing the effluent from the bioreactor into the influent collection system or the headworks of the wastewater treatment plant. Denitrification will occur in the collection pipe using the influent organics as a carbon source. Typically, the wastewater recycle stream generated from the dewatering process from an anaerobicly digested of sludge contains concentrations of nitrogen in the range of 500-1,500 mg/l and alkalinity in the range of 2,000-4,000 mg/l; however, the concentrations of carbonaceous matter are relatively low and in the range of 150-600 mg/l. The pH may range from 7-9. To maintain the oxidation of ammonia to nitrite a supplemental alkalinity source is required to maintain the pH and necessary alkalinity demand of the AOB.

In the first step of the process ammonium is converted to nitrite under aerobic conditions by ammonium oxidizing bacteria as described by the following mass-based equation normalized to ammonium (Grady, Daigger and Lim 1999):

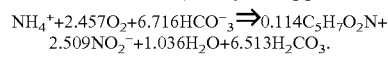

It has been shown that the relative ratios of $C_{DO}/C_{NH4-N}$ and $C_{DO}/C_{FA}$ are indicative of the nitrogen species (i.e. nitrite or nitrate) predominating in the effluent, wherein:

| | |
|---|---|
| $C_{DO}$ - concentration of dissolved oxygen | (mg/l) |
| $C_{NH4-N}$ - concentration of total ammonia mg | ($NH_3$—N/l) |
| $C_{FA}$ - concentration of free ammonia | (mg $NH_3$—N/l) |

In order to have nitrite as the predominating species produced from the biological transformation of ammonia, a $C_{DO}/C_{NH4-N}$ ratio of less than one (1) and a $C_{DO}/C_{FA}$ ratio of less than ten (10) must be maintained within the reactor. Therefore the control mechanism for stopping the two step reaction after the first step is to create such an environment. Controlling the concentration of dissolved oxygen ($C_{DO}$) is achieved by intermittently aerating the bioreactor. Inherent in a high ammonia concentration waste stream with a slightly elevated pH (such as a recycle stream from anaerobic ally digested sludge), is a high concentration of free ammonia which inhibits the nitrification process (i.e. the conversion of nitrite to nitrate).

Microbiological studies of the biofilm indicate that operating the reactor with intermittent aeration coupled with the free ammonia toxicity inherent in the waste stream tend to exclude nitrite oxidizing bacteria from the biofilm, not just suppress them. The result is stable partial nitrification (i.e. ammonia oxidation only).

High concentrations of nitrite are inhibitory to ammonium oxidation, which is caused by the presence of free nitrous acid ($HNO_2$) (Beccari et al.). For ammonium oxidation to be complete (i.e. fractional ammonium) the accumulation of nitrite to levels that are inhibitory must be avoided. Although accumulation of free nitrous acid has been negligible, if it appears, it would be controlled by providing a supplemental carbon source (i.e. electron donor) to the bioreactor. Since the intermittent aeration provides anoxic conditions within the bioreactor addition of a supplemental carbon source would result in denitrification of nitrite as described by the following simplified reaction, and therefore, control nitrite accumulation:

$$6NO^-_2 + 3C_3OH \Rightarrow 3N_2 + 6HCO^{31}_3 + 3H_2O$$

This option would only be required if inhibitory levels of nitrite occurred. However, in a typical waste stream from anaerobic digestion this is not an issue.

The environmental conditions within the influent piping system and the headworks of a typical municipal wastewater treatment plant are conducive to denitrification because of the anoxic and anaerobic conditions that exist and for the quantity of organic carbonaceous matter within the wastewater. Neither nitrite, nor nitrate are typically present in the wastewater at this point; therefore, the collection system and headworks can be utilized has a denitrification reactor by introducing the partially treated (high nitrite concentration) recycle stream into the collection system.

The process offers several advantages over a conventional biological nitrogen removal process. First, nitrogen removal via the nitrite route requires 25% less oxygen. Second, no supplemental carbon source is required since denitrification occurs within the pipe. Third, pipe denitrification reduces the carbonaceous load to the treatment plant. Fourth, addition of nitrite to the collection system may suppress odor production.

These together with other objects of the invention, along with various features of novelty which characterize the invention, are pointed out with particularity in this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF INVENTION

Figure 1:
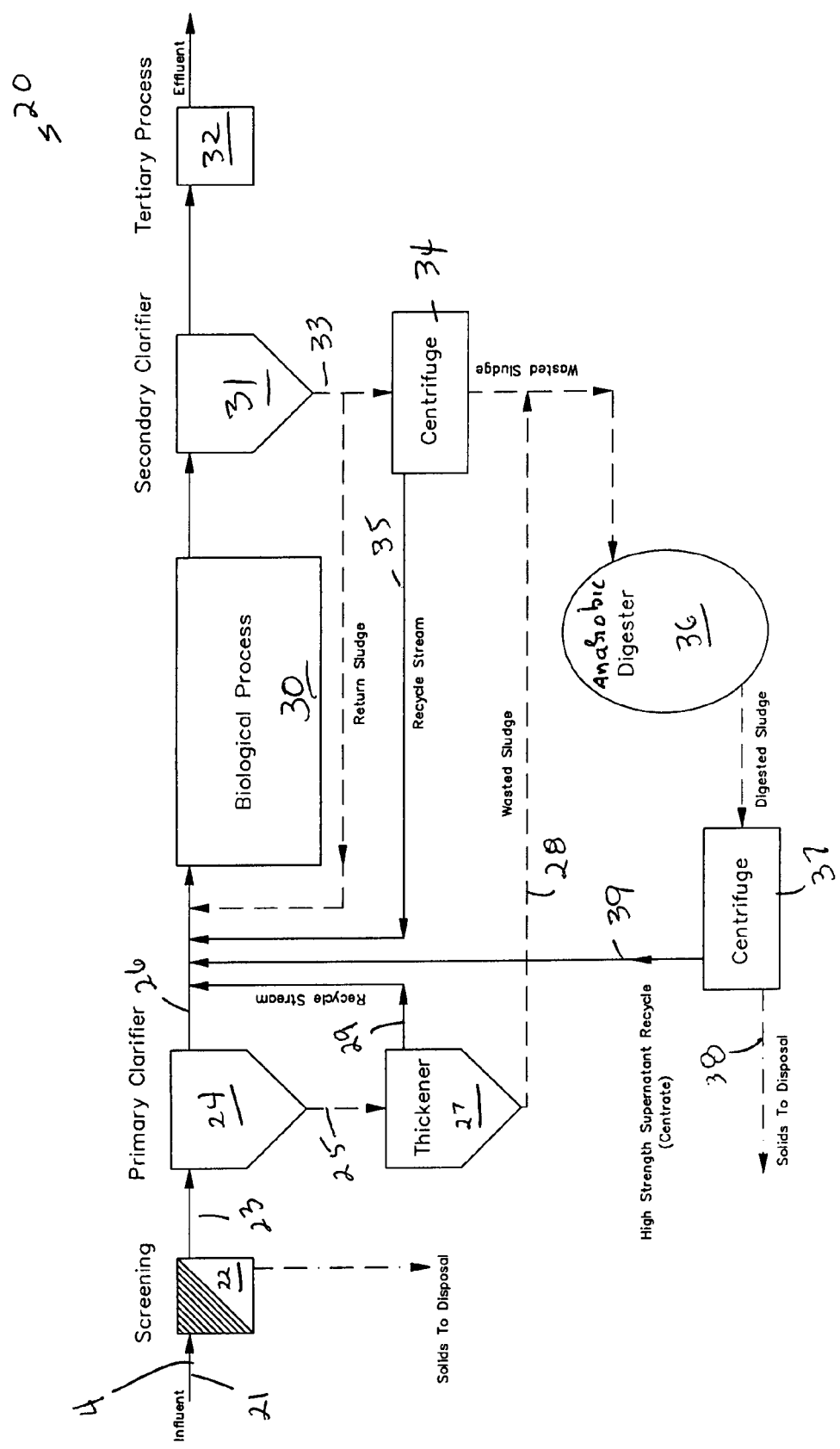
FIG. 1 is a block diagram of the process flow of a typical wastewater treatment plant.

Referring to the drawings in detail wherein like elements are indicated by like numerals, there are shown a process flow for a typical wastewater treatment plant, and the invention process installed in the wastewater treatment plant 20.

Referring more particularly to FIG. 1, a typical wastewater treatment plant 20 will have a raw influent 21 passed to the plant 20 through an influent pipe 4. Solids within the raw influent will be filtered out through a screening assembly 22 and passed out for disposal. The screened raw influent 23 is then passed to a primary clarifier 24 where solids still within the screened raw influent will separate into a sludge component 25 and a liquid component 26. The sludge component 25 is passed to a thickener 27 with the wasted sludge 28 then passed to a digester 36. The clarifier liquid component 26 and thickener liquid component 29 are then brought into the treatment plant's main biological processor 30. The biological processor output is then passed to a secondary clarifier 31 for further settling out and separation of liquid from solids. The liquid from the secondary clarifier is then passed out for a tertiary processing 32. A portion of the sludge component 33 from the secondary clarifier 31 is recycled into the biological processor as return sludge while the remaining sludge is passed to a centrifuge processor 34 for further separation of liquid from solids. The centrifuge solids 34, i.e., wasted sludge, and thickened wasted sludge 28 are passed to a digester 36 for further processing. The centrifuge liquid component 35, i.e., centrate, is formed into a recycle stream 35 and brought back into the biological processor 30. The digester 36 digests the wasted sludge and outputs the digested sludge to a second centrifuge processor 37. Solids 38 from the second centrifuge processor 37 are separated out for disposal. The second centrifuge processor liquid component 39 is recycles back into the plant biological processor 30. The liquid, i.e., supernatant, remaining from the sludge treatment is traditionally recycled and mixed with the raw influent to be treated. Due to the high ammonium concentration in the supernatant the recycle stream may contribute 10-20% of the nitrogen load entering the plant. There are many variations in a typical plant, but a recycle process exists in almost all plants with the consequent nitrogen loading.

Traditionally, the biological reactor 30 processes the influent stream, including the recycle stream, and oxidizes the ammonia content of the stream converting the ammonia, in a two-step process, into a nitrite form and then a nitrate form. The nitrate is then passed through a denitrification process whereby the nitrate is converted to nitrogen gas and released into the atmosphere. The process of converting ammonia to nitrate form requires substantial quantities of oxygen from external air blowers. If denitrification is required as well, substantial quantities of chemicals to provide the carbon source may be required. Supplying air to the biological reactor is one of the biggest cost factors in operating a wastewater treatment plant.

Figure 2:
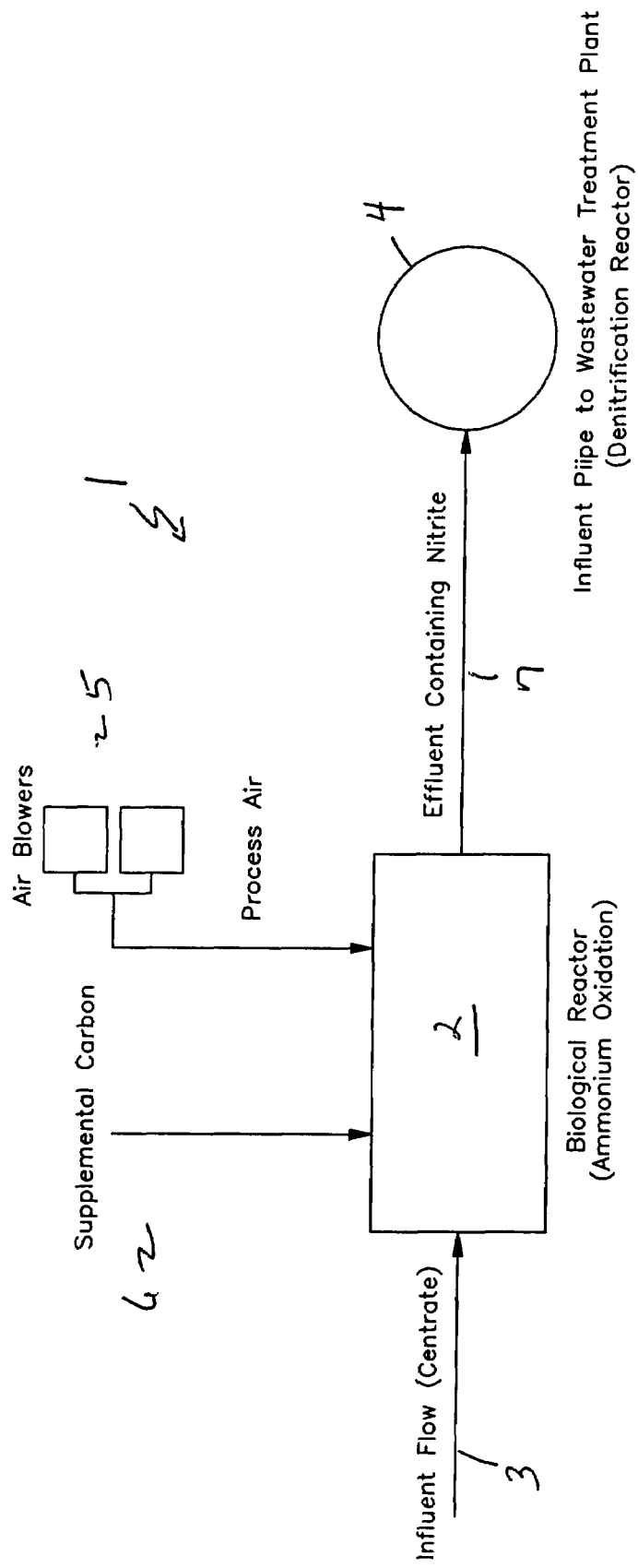
FIG. 2 is a block diagram of the invention system.
Figure 3:
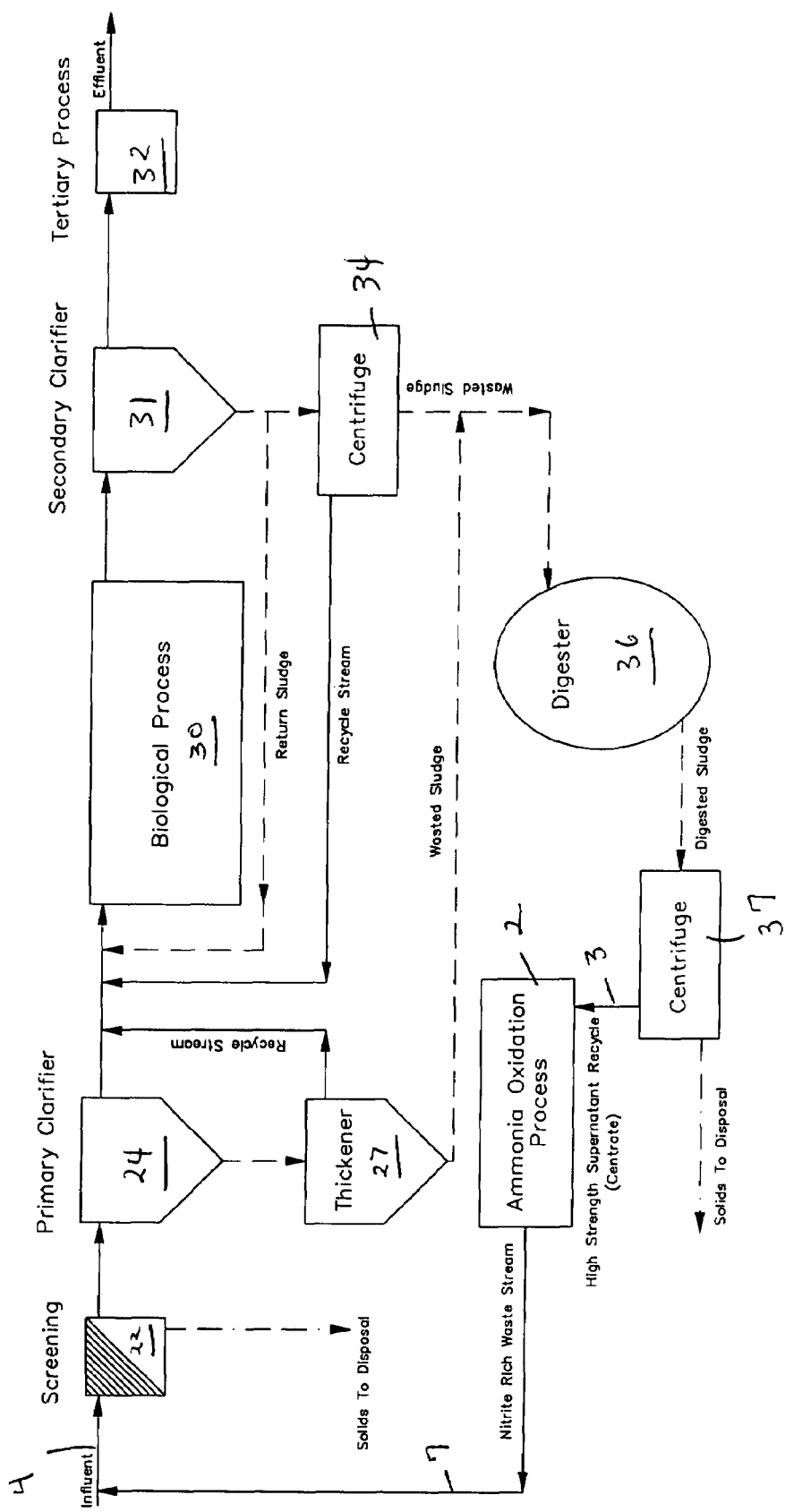
FIG. 3 is a block diagram of a process flow of a typical wastewater treatment plant with side stream treatment according to the invention.

Referring to FIGS. 2 and 3, the present invention treats the supernatant so that the nitrogen is removed, thereby eliminating the 10-20% load contributed by the recycle stream. The supernatant (referred to as centrate if centrifuges are used for dewatering) is brought into a second biological reactor as influent flow 3, i.e., supernatant or centrate. The second biological reactor 3 is intermittently aerated by external air blowers 5 in order to achieve some denitrification thereby controlling the accumulation of nitrite. An organic carbon source is also added to the second biological reactor 3 via a chemical metering system 6 to provide additional control of nitrite accumulation. The nitrite-laden effluent 7 from the second biological reactor 2 is then transferred to the influent pipe 4, or the head works of a main treatment facility. Denitrification from nitrite will occur within the influent pipe 4 before the blended (raw and supernatant recycle) enters the main treatment facility biological process 30. Due to the environmental conditions within the pipe 4, the addition of nitrite allows the influent pipe 4 to act as a denitrification reactor thereby effecting nitrogen removal prior to the main treatment plant's biological process 30. As the nitrite-rich effluent 7 travels within the influent pipe 4 to the main treatment plant, some of the bacteria within the pipe will oxidize the organic carbon by utilizing the nitrite as a terminal electron acceptor. Removal of the nitrite from the recycle stream is accomplished within the influent pipe 4. The nitrogen gas formed is then tapped off the influent pipe and released into the atmosphere. The invention process eliminates the normal second step of nitrification, i.e., converting nitrite to nitrate, thereby reducing the plant's air requirement by up to 25% and reducing the organic carbon requirement by at least 40%, because denitrification is from nitrite rather than nitrate.

It is understood that the above-described embodiment is merely illustrative of the application. Other embodiments may be readily devised by those skilled in the art which will embody the principles of the invention and fall within the spirit and scope thereof. The present invention will be effective in most biological wastewater treatment systems having at least an influent pipe passing raw influent into a first solid separator having a raw influent liquid output portion feeding into a first biological reactor having an output portion being passed into an anaerobic sludge digester having a digested output being passed to a second solid separator. The invention second biological reactor is operationally placed between the second solid separator and the wastewater treatment system influent pipe, wherein nitrite-laden effluent from the second solid separator is inputted into the second biological reactor and the second biological reactor effluent is inserted into the wastewater treatment system influent pipe.

We claim:

1. In a biological wastewater treatment system having at least an influent pipe passing raw influent into a first solid separator having a raw influent liquid output portion feeding into a first biological reactor having an output portion being passed into an anaerobic sludge digester having a digested output being passed to a second solid separator, a method for removing ammonia content from waste streams with a high ammonium-nitrogen concentration, comprising the steps of:
    providing a second biological reactor;
    bringing from said second solid separator an influent flow, selected from the group consisting of supernatant and centrate, into said second biological reactor;
    transferring nitrite-laden effluent from the second biological reactor to said wastewater treatment system influent pipe;
    denitrifying the nitrite-laden effluent within the wastewater treatment system influent pipe;
    tapping off a formed nitrogen gas from the wastewater treatment system influent pipe.

2. The method as recited in claim 1, further comprising the step of:
    intermittently aerating the second biological reactor to control the accumulation of nitrite.

3. The method as recited in claim 2, further comprising the step of:
    adding an organic carbon source to the second biological reactor to provide additional control of nitrite accumulation.

\* \* \* \* \*